US010075723B2

(12) United States Patent
Boon et al.

(10) Patent No.: US 10,075,723 B2
(45) Date of Patent: *Sep. 11, 2018

(54) MODE IDENTIFICATION DATA REDUCING METHOD FOR INTRA-PREDICTION CODING

(71) Applicant: NTT DOCOMO, INC., Tokyo (JP)

(72) Inventors: Choong Seng Boon, Yokohama (JP); Junya Takiue, Tokyo (JP); Thiow Keng Tan, Jalan Sindor (SG)

(73) Assignee: NTT DOCOMO, INC., Tokyo (JP)

( * ) Notice: Subject to any disclaimer, the term of this patent is extended or adjusted under 35 U.S.C. 154(b) by 529 days.

This patent is subject to a terminal disclaimer.

(21) Appl. No.: 13/941,235

(22) Filed: Jul. 12, 2013

(65) Prior Publication Data

US 2013/0301724 A1 Nov. 14, 2013
US 2017/0208324 A9 Jul. 20, 2017

Related U.S. Application Data

(63) Continuation of application No. PCT/JP2011/079071, filed on Dec. 15, 2011.

(30) Foreign Application Priority Data

Jan. 12, 2011 (JP) ................................. 2011-004293

(51) Int. Cl.
 *H04N 19/50* (2014.01)
 *H04N 19/593* (2014.01)
 (Continued)

(52) U.S. Cl.
 CPC ............. *H04N 19/50* (2014.11); *H04N 19/11* (2014.11); *H04N 19/137* (2014.11);
 (Continued)

(58) Field of Classification Search
 CPC ............. H04N 19/00569; H04N 19/46; H04N 19/176; H04N 19/11; H04N 19/137;
 (Continued)

(56) References Cited

U.S. PATENT DOCUMENTS 6,765,964 B1 7/2004 Conklin
7,289,674 B2 10/2007 Karczewicz
(Continued)

FOREIGN PATENT DOCUMENTS

CN 101682770 A 3/2010
EP 2 165 543 A2 3/2010
(Continued)

OTHER PUBLICATIONS

Zhan et al. ("Temporal-Spatial Correlation Based Mode Decision Algorithm for H.264/AVC Encoder" IEEE, 2008).*
(Continued)

*Primary Examiner* — Mohammed Jebari
(74) *Attorney, Agent, or Firm* — Brinks Gilson & Lione

(57) ABSTRACT

A predictive coding system performs predictive encoding by determination of an optimum prediction mode from prediction methods for a pixel signal of a target block. A predicted signal is generated according to the determined mode, and a residual signal is determined. The residual signal and the optimum prediction mode are encoded to generate a compressed signal, which is decoded. The decoded signal is stored as a reconstructed picture sample. During encoding, a candidate prediction mode list is generated that contains elements of optimum prediction modes of previously-reproduced blocks neighboring the target block. A flag indicating whether the list contains an element corresponding to the optimum prediction mode is encoded, and an index to the corresponding element is encoded if the corresponding element is included in the list. The optimum prediction mode
(Continued)

can be encoded based on identifying the elements in the list, unless no corresponding element appears on the list.

3 Claims, 16 Drawing Sheets

(51) Int. Cl.
    *H04N 19/11*      (2014.01)
    *H04N 19/46*      (2014.01)
    *H04N 19/137*      (2014.01)
    *H04N 19/176*      (2014.01)
    *H04N 19/61*      (2014.01)

(52) U.S. Cl.
    CPC ........... *H04N 19/176* (2014.11); *H04N 19/46* (2014.11); *H04N 19/593* (2014.11); *H04N 19/61* (2014.11)

(58) Field of Classification Search
    CPC ........ H04N 19/593; H04N 19/61; H04N 7/50; H04N 7/26244; H04N 7/26031; H04N 7/26015; H04N 7/26707
    See application file for complete search history.

(56) References Cited

U.S. PATENT DOCUMENTS

| | | | |
|---|---|---|---|
| 8,428,133 B2 | 4/2013 | Ye et al. | |
| 8,488,668 B2 | 7/2013 | Ye et al. | |
| 8,520,732 B2 | 8/2013 | Ye et al. | |
| 8,571,104 B2 | 10/2013 | Ye et al. | |
| 8,619,853 B2 | 12/2013 | Ye et al. | |
| 2003/0231795 A1 | 12/2003 | Karczewicz | |
| 2004/0008771 A1 | 1/2004 | Karczewicz | |
| 2005/0157797 A1 | 7/2005 | Gaedke | |
| 2006/0188165 A1 | 8/2006 | Karczewicz | |
| 2008/0013629 A1 | 1/2008 | Karczewicz | |
| 2008/0123977 A1 | 5/2008 | Moriya et al. | |
| 2008/0310507 A1 | 12/2008 | Ye et al. | |
| 2009/0003441 A1 | 1/2009 | Sekiguchi et al. | |
| 2009/0034632 A1 | 2/2009 | Chono | |
| 2009/0310677 A1* | 12/2009 | Shiodera ................ H04N 19/70 375/240.15 |
| 2010/0054616 A1 | 3/2010 | Kim | |
| 2010/0208802 A1 | 8/2010 | Tsukuba et al. | |
| 2011/0249741 A1* | 10/2011 | Zhao .................... H04N 19/197 375/240.15 |
| 2011/0286520 A1 | 11/2011 | Xu et al. | |
| 2013/0114668 A1* | 5/2013 | Misra .................... H04N 19/13 375/240.02 |
| 2014/0112387 A1 | 4/2014 | Ye et al. | |
| 2014/0126629 A1* | 5/2014 | Park ................. H04N 19/00042 375/240.02 |

FOREIGN PATENT DOCUMENTS

| | | |
|---|---|---|
| EP | 2 661 880 A1 | 11/2013 |
| JP | 2005-529527 | 9/2005 |
| JP | 2010-530184 A | 9/2010 |
| WO | WO 2008/157269 A2 | 12/2008 |
| WO | WO 2012/092763 A1 | 7/2012 |

OTHER PUBLICATIONS

Canadian Office Action, dated Feb. 19, 2015, pp. 1-4, issued in Canadian Patent Application No. 2,824,426, Canadian Intellectual Property Office, Gatineau, Quebec.
Wiegand, Thomas, "Draft Text of Final Draft International Standard (FDIS) of Joint Video Specification (ITU-T Rec. H.264|ISO/IEC 14496-10 AVC)," Mar. 14, 2003, pp. 95-101, Joint Video Team (JVT) of ISO/IEC MPEG&ITU-T VCEG (ISO/IEC JTC1/SC29/ WT11 and ITU-T SG16 Q.6), 7$^{th}$ Meeting, Pattaya, Thailand.
Chinese Office Action with English translation, dated Sep. 6, 2015, pp. 1-14, issued in Chinese Patent Application No. 201180061785. 8, State Intellectual Property Office of China, Beijing, People's Republic of China.
Australian Patent Examination Report No. 1, dated Sep. 16, 2014, pp. 1-3, issued in Australian Patent Application No. 2011354861, IP Australia, Woden, ACT, Australia.
International Search Report re Application No. PCT/JP2011/079071 dated Mar. 27, 2012 (2 Pgs.).
Taiwan Office Action with English translation, dated Jul. 31, 2015, pp. 1-9, issued in Taiwan Patent Application No. 101100933, Taiwan Intellectual Property Office, Taipei City, Taiwan, R.O.C.
Japanese Office Action, dated Feb. 17, 2015, pp. 1-10, issued in Japanese Patent Application No. P2011-004293, Japanese Patent Office, Tokyo, Japan.
Japanese Office Action with English translation, dated Feb. 17, 2015, pp. 1-6, issued in Japanese Patent Application No. P2014-227206, Japanese Patent Office, Tokyo, Japan.
Office Action, and English language translation thereof, in corresponding Japanese Application No. 2015-141139, dated Jul. 19, 2016, 7 pages.
Office Action, and English language translation thereof, in corresponding Chinese Application No. 201180061785.8, dated Nov. 16, 2016, 13 pages.
Qualcomm Inc., "Improved IntraCoding", ITU-T SG16 Meeting; 26-6-2007-6-7-8007; Geneva, No. T05-SG16-C-0257, Jun. 20, 2007, XP030003827, 4 pages.
Kanumuri, S. et al., "Enhancements to Intra Coding", 4. JCT-VC Meeting; 95. MPEG Meeting; 20-1-2011-28-1-2011; DAEGU;(Joint Collaborative Team on Video Coding of ISO/IEC JTC1/SC29/ WG11 and ITU-T SG.16); URL: http://wft3.1tu.int/av-arch/jctvc-site/, No. JCTVC-D235, Jan. 14, 2011, XP0300008275, 8 pages.
Guo, M. et al., "Improved Intra Mode Coding", 4. JCT-VC Meeting; 95. MPEG Meeting; 20-1-2011-28-1-2011; Daegu; (Joint Cllaborative Team on Video Coding of ISO/IEC JTC1/SC29/WG11and ITU-T SG. 16); URL: http://wftp3.itu.int/av-arch/jctv-site/, No. JCTVC-D166, Jan. 15, 2011, XP030008206, 8 pages.
Extended Search Report in corresponding European Application No. 11855271.0, dated May 9, 2017, 13 pages.
Office Action in corresponding Australian Application No. 2016202458, dated Apr. 4, 2017, 3 pages.
Office Action, and English language translation thereof, in corresponding Chinese Application No. 201180061785.8, dated Apr. 12, 2017, 16 pages.
Office Action in corresponding Canadian Application No. 2,936,495, dated May 11, 2017, 4 pages.
Office Action in U.S. Appl. No. 15/406,384, dated Jun. 5, 2017, 11 pages.
Office Action in corresponding Chinese Application No. 201180061785. 8, dated Sep. 28, 2017, 16 pages.
Office Action in U.S. Appl. No. 15/406,384, dated Sep. 25, 2017, 13 pages.
Office Action in U.S. Appl. No. 15/601,142, dated Aug. 22, 2017, 12 pages.
Office Action, and English language translation thereof, in corresponding Chinese Application No. 201510932650.4, dated Dec. 28, 2017, 17 pages.
Office Action, and English language translation thereof, in corresponding Chinese Application No. 201510854560.8, dated Jan. 2, 2018, 19 pages.
Office Action in corresponding Canadian Application No. 2,936,495, dated Feb. 26, 2018, 6 pages.
Office Action in U.S. Appl. No. 15/601,142, dated Feb. 28, 2018, 11 pages.
Office Action, and English language translation thereof, in corresponding Chinese Application No. 201180061785.8, dated Feb. 27, 2018, 17 pages.
Office Action, and English language translation thereof, in corresponding Chinese Application No. 201710102113.6, dated Feb. 5, 2018, 16 pages.
Office Action, and English language translation thereof, in corresponding Japanese Application No. P2016-214430, dated Dec. 5, 2017, 7 pages.

(56) References Cited

OTHER PUBLICATIONS

Office Action in U.S. Appl. No. 15/406,384, dated Dec. 12, 2017, 19 pages.
US Patent Office, Advisory Action Before the Filing of an Appeal Brief, for U.S. Appl. No. 15/601,142 dated Jun. 5, 2018, pp. 1-8.
Office Action in Indian Application No. 5021/CHENP/2013 dated Jul. 10, 2018, pp. 1-7.

* cited by examiner

| 1 | 5 | 8 | 12 | 15 |
|---|---|---|----|----|

(B)

| 0 | 2 | 3 | 4 | 6 | 7 | 9 | 10 | 11 | 13 | 14 |
|---|---|---|---|---|---|---|----|----|----|----|

(C)

| 0 | 1 | 2 | 3 | 4 | 5 | 6 | 7 | 8 | 9 | 10 |
|---|---|---|---|---|---|---|---|---|---|----|

MODE IDENTIFICATION DATA REDUCING METHOD FOR INTRA-PREDICTION CODING

This application is a continuation of PCT/JP2011/079071, filed Dec. 15, 2011, which claims the benefit of the filing date pursuant to 35 U.S.C. § 119(e) of JP2011-004293, filed Jan. 12, 2011, both of which are incorporated herein by reference.

TECHNICAL FIELD

The present invention relates a predictive coding system that includes image predictive encoding and decoding methods, devices, and programs and, more particularly, to methods, devices, and programs for predictive encoding and decoding using a signal in a frame.

BACKGROUND ART

The compression encoding technologies are used for efficient transmission and storage of still pictures and video data. The systems of MPEG1 to MPEG4 and H.261 to H.264 are commonly used for video data.

A predictive coding system provides a method, device, and program for efficient encoding of mode information to identify the intra-frame prediction method of the target block even in the case where a larger number of prediction modes are provided in the method of generation of intra-frame predicted signals. to the predictive coding system further provides a method, device, and program for efficient decoding of encoded mode information.

The predictive coding system may perform an image predictive encoding method that includes: a region division step of partitioning an input picture into a plurality of blocks; a predicted signal generation step of determining, for pixel signals contained in a target block selected from a plurality of blocks, an optimum prediction mode with the smallest difference from among a plurality of prediction methods, and generating a prediction signal according to the optimum prediction signal, and generating a predicted signal in accordance with the optimum prediction mode; a residual signal generation step of obtaining a residual signal representing a difference between the pixel signal of the target block and the predicted signal; a signal encoding step of encoding the residual signal to generate a compressed signal; a prediction mode encoding step of encoding the optimum prediction mode; and a storage step of restoring the compressed signal and storing a restored signal as a reconstructed picture sample, or decoded signal, wherein the prediction mode encoding step includes: generating a candidate prediction mode list containing elements of optimum prediction modes of a plurality of previously-reproduced blocks neighboring the target block; encoding a flag to indicate whether the candidate prediction mode list contains an element corresponding to the optimum prediction mode; further encoding an index to the corresponding element in the candidate prediction mode list when there is a corresponding element; when there is no corresponding element, encoding with a number using the optimum prediction mode, after each element in the candidate prediction mode list is removed.

The predictive coding system may perform an image predictive decoding method that includes: an input step of accepting input of compressed picture data containing a residual signal and encoded information, the residual signal generated by dividing a picture into a plurality of blocks and performing predictive encoding of a target block, and the encoded information being about a prediction mode indicative of a generation method of a predicted signal of the target block; a restoration step of extracting the residual signal of the target block from the compressed picture data to restore a reproduced residual signal; a prediction mode decoding step of restoring the encoded information about the prediction mode to generate an optimum prediction mode; a predicted signal generation step of generating the predicted signal of the target block, the predicted signal generated based on the optimum prediction mode; a picture restoration step of adding the predicted signal to the reproduced residual signal to restore a pixel signal of the target block; and a storage step of storing the restored pixel signal as a reconstructed picture sample, or decoded signal, wherein the prediction mode decoding step includes: generating a candidate prediction mode list containing elements of optimum prediction modes of a plurality of previously-reproduced blocks neighboring the target block; decoding a flag to indicate whether the candidate prediction mode list contains an element corresponding to the optimum prediction mode; 1) when the flag indicates that "there is a corresponding element", further decoding an index that indexes the candidate prediction mode list and defines an element indicated by the index as the optimum prediction mode; 2) when the flag indicates that "there is no corresponding element", further decoding information about an REM mode and defining, as the optimum prediction mode, a value of the REM mode, which is converted based on the candidate prediction mode list.

In an embodiment, when the prediction mode information of the target block is encoded by performing intra-frame prediction using more intra-frame prediction modes than in the conventional technology, since the candidate prediction mode list consisting of a plurality of prediction modes is prepared, and an identifier of an element coincident with the prediction mode of the target block from the prepared candidate prediction mode list is encoded; the probability that the element is coincident with the prediction mode of the target block becomes higher, and thus the prediction mode information can be encoded by a smaller bit count. In other words, there is only one "most probable mode" in the conventional technology, whereas a plurality of "most probable modes" are prepared in the present invention; therefore, the present invention provides an effect of increasing the probability of occurrence of a "most probable mode" coincident with the prediction mode of the target block.

If the prediction mode of the target block is absent in the candidate prediction mode list, the prediction mode of the target block itself is encoded but, in that case, since a plurality of prediction modes in the candidate prediction mode list are excluded and new identification numbers are assigned to the remaining prediction modes, the prediction mode of the target block can be expressed by a smaller number, allowing encoding with a smaller bit length.

Namely, the predictive coding system provides an effect of enabling more efficient encoding of the information about the prediction mode in the case where the intra-frame prediction is carried out by more intra-frame prediction modes than in the conventional technology.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The predictive coding system, may be better understood with reference to the following drawings and description. The components in the figures are not necessarily to scale, emphasis instead being placed upon illustrating the principles of the system. Moreover, in the figures, like referenced numerals designate corresponding parts throughout the different views.

FIG. 6 is a schematic diagram for explaining an example of the generation process of REM mode number in the processing of the intra-frame prediction mode encoder (FIG. 3) according to an embodiment of the predictive coding system.

EMBODIMENTS OF THE INVENTION

Embodiments of the present invention will be described below using FIGS. 1 to 16.

In encoding systems, a picture which is an encoding target can be divided into a plurality of blocks and then an encoding/decoding process of the blocks can be carried out. In some examples, to further increase encoding efficiency, intra-frame predictive encoding can be carried out in such a manner that a predicted signal is generated using a neighboring previously-reproduced pixel signal (restored signal of compressed picture data) present in the same frame as a target block, and then a difference signal obtained by subtracting the predicted signal from a signal of the target block is encoded, such as in the example of MPEG4 and H.264. In inter-frame predictive encoding, compensation for motion can be made with reference to another previously-reproduced picture signal present in a frame different from that of a target block to generate a predicted signal, and a difference signal obtained by subtracting the generated predicted signal from a signal of the target block is encoded.

Figure 13:
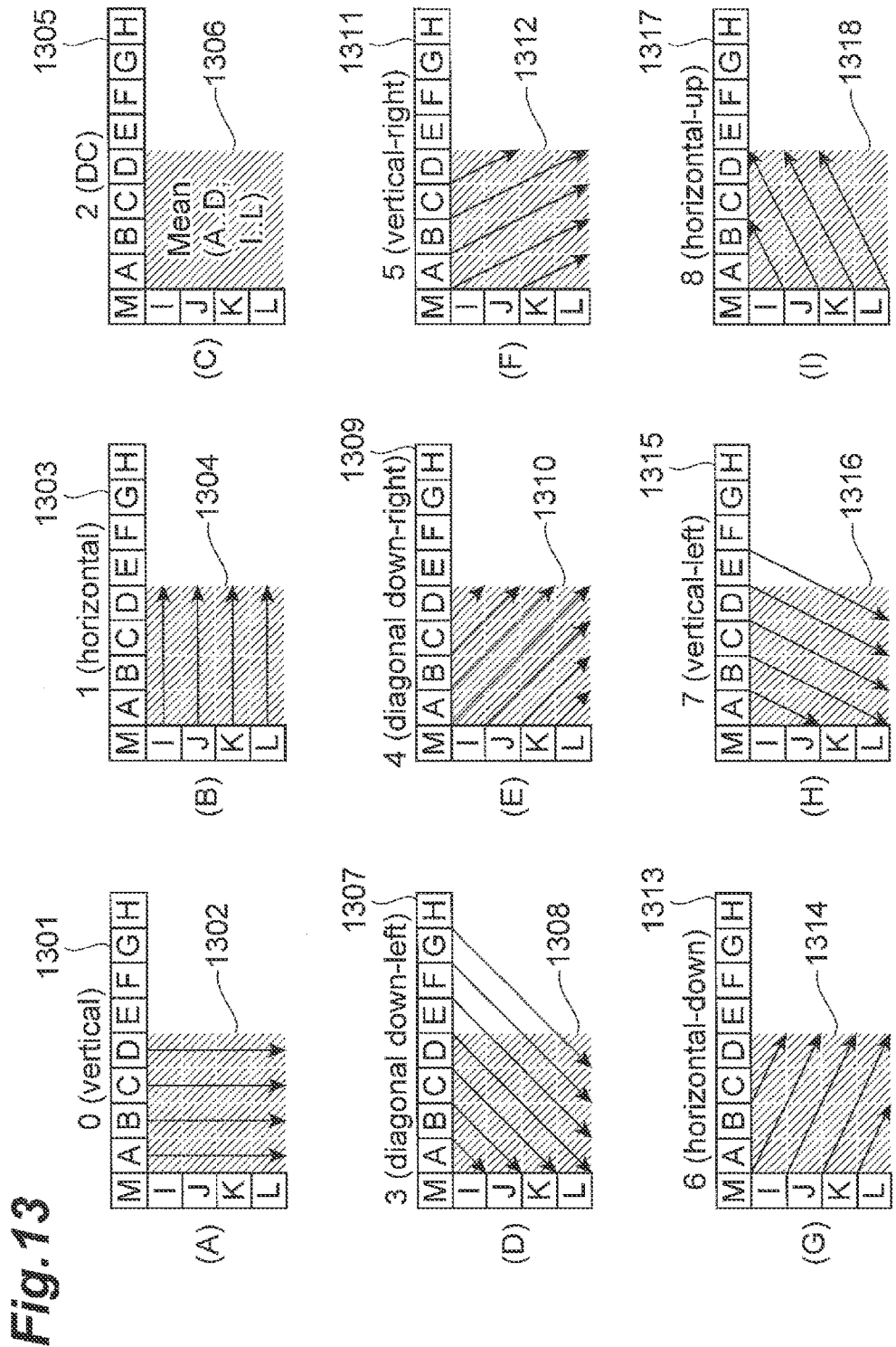
FIG. 13 is a schematic diagram showing an example of methods of generating a predicted signal of a target block.
Figure 14:
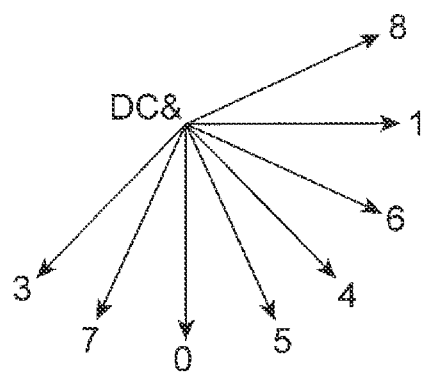
FIG. 14 is a schematic diagram in which a plurality of example methods for generation of the predicted signal of the target block are brought together in a view.

The intra-frame predictive encoding can adopt a method of extrapolating previously-reproduced pixel values neighboring a block as an encoding target, in predetermined directions to generate the predicted signal, such as in the example of H.264. FIG. 13 is a schematic diagram example for explaining an intra-frame prediction method, such as that used in H.264. In FIG. 13 (A), a block 1302 is a target block and a pixel group consisting of pixels A-M (1301) neighboring a boundary of the target block is a neighboring region, which is a picture signal previously reproduced in past processing. In this case, the predicted signal is generated by downwardly duplicating the neighboring pixels (A-D) located immediately above the target block 1302. In FIG. 13 (B), the predicted signal is generated by rightwardly duplicating previously-reproduced pixels (I-L) located to the left of target block 1304. An example of specific methods for generation of the predicted signal are described in U.S. Pat. No. 6,765,964. A difference is calculated between each of nine predicted signals generated by the example methods shown in FIG. 13 (A) to (I) in this manner, and the pixel signal of the target block, and a method to provide the smallest difference is defined as an optimum prediction method. These extrapolation methods can be brought together as shown in FIG. 14. In FIG. 14, arrows indicate extending directions of previously-reproduced pixels and numbers for the respective directions are identification numbers of the respective prediction modes. An identification number for prediction by an average of surrounding previously-reproduced pixels is a predetermined number, such as 2, and is denoted by DC in FIG. 14. These identification numbers are also referred to as identification information about the intra-frame prediction method, or as mode information, or simply as prediction modes.

The prediction mode of a block undergoing intra-frame prediction can be sent to the transmission side. On that occasion, the intra-frame prediction mode of the target block is encoded with reference to the intra-frame prediction modes of an upper neighboring block and a left neighboring block for the target block. Namely, a comparison is made between the intra-frame prediction modes of the upper neighboring block and the left neighboring block and the block with a smaller value is determined as reference mode information (most probable mode). The intra-frame prediction mode of the target block is encoded based on this reference mode information. In other examples, other neighboring blocks may be used.

A symbol to indicate whether the intra-frame prediction mode of the target block is identical to the reference mode information can be encoded. When the symbol is, for example, 1, the intra-frame prediction mode of the target block is the same as the reference mode information. When the symbol is different, for example, 0, information about the intra-frame prediction mode of the target block is encoded. However, if a number indicative of the intra-frame prediction mode of the target block is different, such as larger, than a number of the reference mode information, encoding is performed after making a modification; such as subtracting one from the number indicative of the intra-frame prediction mode of the target block.

On the reproduction side, the symbol is first decoded in the intra-frame predicted target block. When the symbol is, for example, 1, it is meant thereby that the intra-frame prediction mode of the target block is the same as the reference mode information. When the symbol is different, for example, 0, the information about the intra-frame prediction mode is further decoded. However, if the number of the decoded prediction mode is, for example, equal to or larger than the reference mode information, the intra-frame prediction mode of the target block is determined by making the modification in reverse, such as by adding one.

Accuracy of the intra-frame prediction is improved by providing more intra-frame prediction modes. For example, it is effective to provide options of extrapolation for the predicted signal from intermediate angles (directions), in addition to the nine modes shown in FIG. 14. However, the increase of prediction methods can lead to a reduction in encoding efficiency of the identification information (prediction mode) to specify the intra-frame prediction method.

A reason for the encoding efficiency is that the increase in the number of intra-frame prediction modes results in statistical reduction in probability of correlation between the prediction mode of the target block and the reference mode information (most probable mode). In addition, the encoding of the prediction mode itself, in the case of disagreement with the reference mode information, can require a larger bit count because the number of intra-frame prediction modes is increased.

Figure 1:
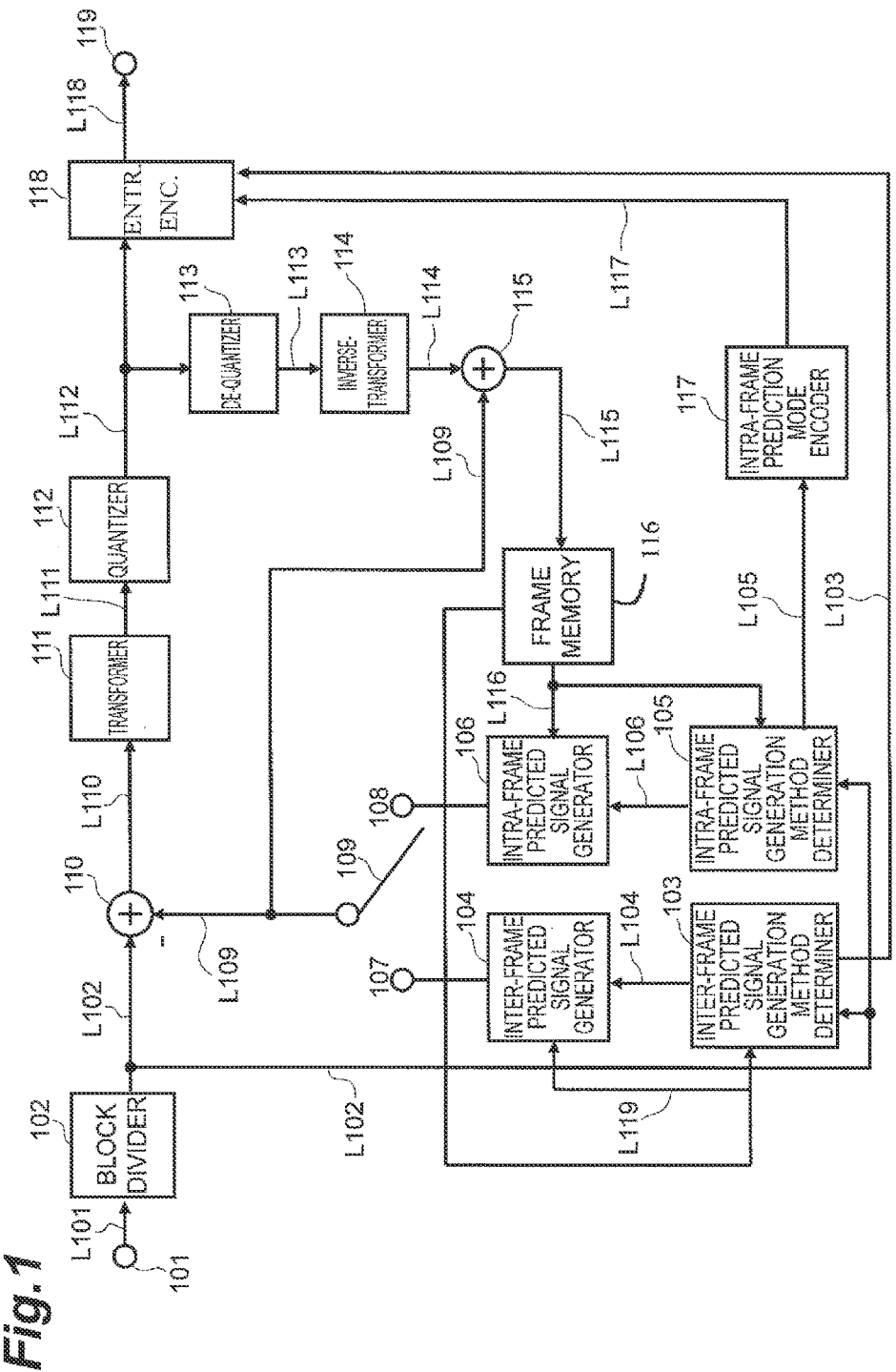
FIG. 1 is a block diagram showing an example of an image predictive encoding device according to an embodiment of the predictive coding system.

FIG. 1 is a block diagram showing an example of an image predictive encoding device according to an embodiment of the predictive coding system. The image predictive encoding device may be a computing device or computer, including for example software, hardware, or a combination of hardware and software, as described later, capable of performing the described functionality. The image predictive encoding device may be one or more separate systems or devices included in the predictive coding system, or may be combined with other systems or devices within the predictive coding system. In other examples, fewer or additional blocks may be used to illustrate the functionality of the image predictive encoding device. The example image predictive encoding device includes an input terminal unit 101, block divider unit 102, inter-frame predicted signal generation method determiner unit 103, inter-frame predicted signal generator unit 104, intra-frame predicted signal generation method determiner unit 105, intra-frame predicted signal generator unit 106, changeover switch unit 109, subtracter unit 110, transformer unit 111, quantizer unit 112, de-quantizer unit 113, inverse-transformer unit 114, adder unit 115, frame memory unit 116, intra-frame prediction mode encoder unit 117, entropy encoder unit 118, and output terminal unit 119. Each "unit" described herein, is hardware, or a combination of hardware and software. For example, each unit may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a "unit" by a processor can also refer to logic based processing by the unit that is initiated directly or indirectly by a processor to complete a process or obtain a result. Alternatively or in addition, each "unit" can include memory hardware, such as at least a portion of a memory, for example, that includes instructions executable with a processor to implement one or more of the features of the unit. When any one of the units includes instructions stored in memory and executable with the processor, the unit may or may not include the processor. In some examples, each unit may include only memory storing instructions executable with a processor to implement the features of the corresponding unit without the unit including any other hardware. Because each unit includes at least some hardware, even when the hardware includes software, each unit may be interchangeably referred to as a hardware unit, such as the input terminal hardware unit 101, or the block divider hardware unit 102, for example.

Below is an example description of the operation of the image predictive encoding device configured as described above. A signal of a video sequence consisting of a plurality of pictures is fed into the input terminal 101. A picture as an encoding target is divided, or partitioned, into a plurality of regions by the block divider 102. In an embodiment of the predictive coding system, each picture is divided, or partitioned, into blocks, where each block consists of 8×8 pixels, but each picture may be divided, or partitioned, into blocks of any other size or shape. Then a predicted signal is generated for a region as an encoding target (hereinafter referred to as "target block"). In an embodiment is the predicted signal can be generated using two types of prediction methods, inter-frame prediction and intra-frame prediction.

In the inter-frame prediction, a reproduced picture having a different display time than that of a target picture, and which has been encoded and then restored in the past, or previously decoded, is used as a reference picture, and motion information which provides a predicted signal with the smallest error from the target block is determined from the reference picture. Depending upon the situation, it is also possible to adopt a method of subdividing the target block into small regions and determining the inter-frame prediction method for each subdivided small region. In this case, the most efficient division method from among a variety of division methods, and corresponding motion information can be determined for the entire target block. In an embodiment of the predictive coding system, this processing can be carried out by the inter-frame predicted signal generation method determiner 103, the target block is fed via line L102, and the reference picture is fed via L119. With regard to the reference picture, a plurality of pictures that have been encoded and restored in the past (previously decoded), are used as reference pictures. The details of these operations may be similar to, for example, any one or more of the methods of MPEG-2, 4 and H.264. The motion information and small region division method determined as described above can be fed via line L104 to the inter-frame predicted signal generator 104. These pieces of information can also be fed via line L103 to the entropy encoder 118 and are encoded thereby, and the encoded data is output from the output terminal 119. The inter-frame predicted signal generator 104 can acquire reference signals from the frame memory 116 (via line L119), based on the small region division method and the motion information corresponding to each small region, and generates a predicted signal for each small region. The inter-frame predicted signal generated in this manner is sent via terminal 107 to the next process block.

In the intra-frame prediction, an intra-frame predicted signal is generated using previously-reproduced pixel values neighboring a target block in the same frame. A generation method of the intra-frame predicted signal is determined by the intra-frame predicted signal generation method determiner 105. The processing of the intra-frame predicted signal generation method determiner 105 will be described later. Information (prediction mode) about the intra-frame prediction method determined in this manner is sent via line L106 to the intra-frame predicted signal generator 106. The information (prediction mode) about the intra-frame prediction method is also sent via line L105 to the intra-frame prediction mode encoder 117. The processing of the intra-frame prediction mode encoder 117 will be described later. The results of the processing are sent to the entropy encoder 118 to be encoded thereby, and the encoded data is sent from the output terminal 119. The intra-frame predicted signal generator 106 acquires neighboring previously-reproduced (previously decoded) pixel signals in the same frame from the frame memory 116 (via line L116), based on the information about the prediction method, and generates a predicted signal by a predetermined method. The intra-frame predicted signal generated in this manner is sent via terminal 108 to the next process block.

From the inter-frame and intra-frame predicted signals obtained as described above, the changeover switch 109 selects the predicted signal with the smallest error and sends it to the subtracter 110. However, since there is no past picture for the first picture, all target blocks are at first processed by the intra-frame prediction. In this case, the switch 109 is always connected to the terminal 108 during processing of the picture. The intra-frame prediction method and intra-frame prediction mode encoding method described below are also applicable to encoding and decoding of still pictures.

The subtracter 110 subtracts the predicted signal (fed via line L109) from the signal of the target block (fed via line L102) to generate a residual signal. This residual signal is transformed by a discrete cosine transform by the transformer 111 and coefficients thereof are quantized by quantizer 112. Finally, the entropy encoder 118 encodes the quantized transform coefficients and sends the encoded data along with the information about the prediction method (prediction mode) and other information from the output terminal 119.

For the intra-frame prediction or the inter-frame prediction of a subsequent target block, it may be necessary to perform inverse processing and restoration of the compressed signal of the target block. Namely, the de-quantizer 113 can perform de-quantization of the quantized transform coefficients and the inverse-transformer 114 can perform an inverse discrete cosine transform of the transform coefficients, thereby restoring a residual signal. The adder 115 adds the restored residual signal to the predicted signal fed through line L109, to reproduce a picture signal of the target block, which is stored into the frame memory 116.

Figure 2:
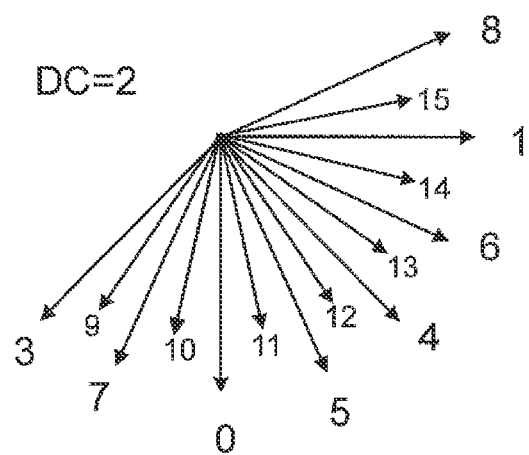
FIG. 2 is a schematic diagram showing an example of pixel extrapolation directions corresponding to intra-frame prediction modes used in an image predictive encoding device according to an embodiment of the predictive coding system.

The following will describe the intra-frame predicted signal generation method determiner 105 used in the predictive coding system. FIG. 2 is a schematic diagram showing pixel extrapolation methods corresponding to intra-frame prediction modes used in an embodiment of the predictive coding system. In the present embodiment, intra-frame predicted signals are generated by a total of sixteen methods. Numbers in FIG. 2 are identification numbers to identify the respective intra-frame prediction methods and are referred to as prediction mode information or unit prediction modes. In the respective prediction modes (from number 0 to number 15), previously-reproduced (or decoded) pixel signals neighboring a target block are extrapolated in directions indicated by respective arrows in FIG. 2, to generate the intra-frame predicted signals. Specific extrapolation methods about the prediction modes 0 to 8 are shown in FIG. 13 and the calculation methods thereof are described in Patent Literature 1. In each of the prediction modes 9 to 15, similarly, the intra-frame predicted signal is also generated by linear interpolation from surrounding previously-reproduced pixel signals to duplicate interpolated values in a direction of a corresponding arrow. The present embodiment employs, for example, sixteen intra-frame prediction methods, but it should be noted that the encoding and decoding methods of prediction mode according to embodiments of the predictive coding system can also be applied to cases using the other numbers of prediction modes and other generation methods of predicted signal.

The intra-frame predicted signal generation method determiner 105 generates, a predetermined number, such as sixteen intra-frame predicted signals, based on the number, such as these sixteen prediction modes, and, for each signal, calculates a difference thereof from the pixel signal of the target block sent via line L102. It determines a prediction mode which provides the smallest difference, as an intra-frame prediction mode of the target block.

As described above, either the intra-frame prediction or the inter-frame prediction is selected for the target block (by switch 109) and, when the intra-frame prediction is selected, the intra-frame prediction mode encoder 117 processes the intra-frame prediction mode of the target block. In the encoding method of the intra-frame prediction mode according to an embodiment of the predictive coding system, it is necessary to use the intra-frame prediction modes (identification numbers) of previously-encoded blocks, and therefore the intra-frame prediction mode encoder 117 is provided with a storage memory (not shown), for storage of the intra-frame prediction modes (identification numbers) of previously-encoded blocks.

Figure 3:
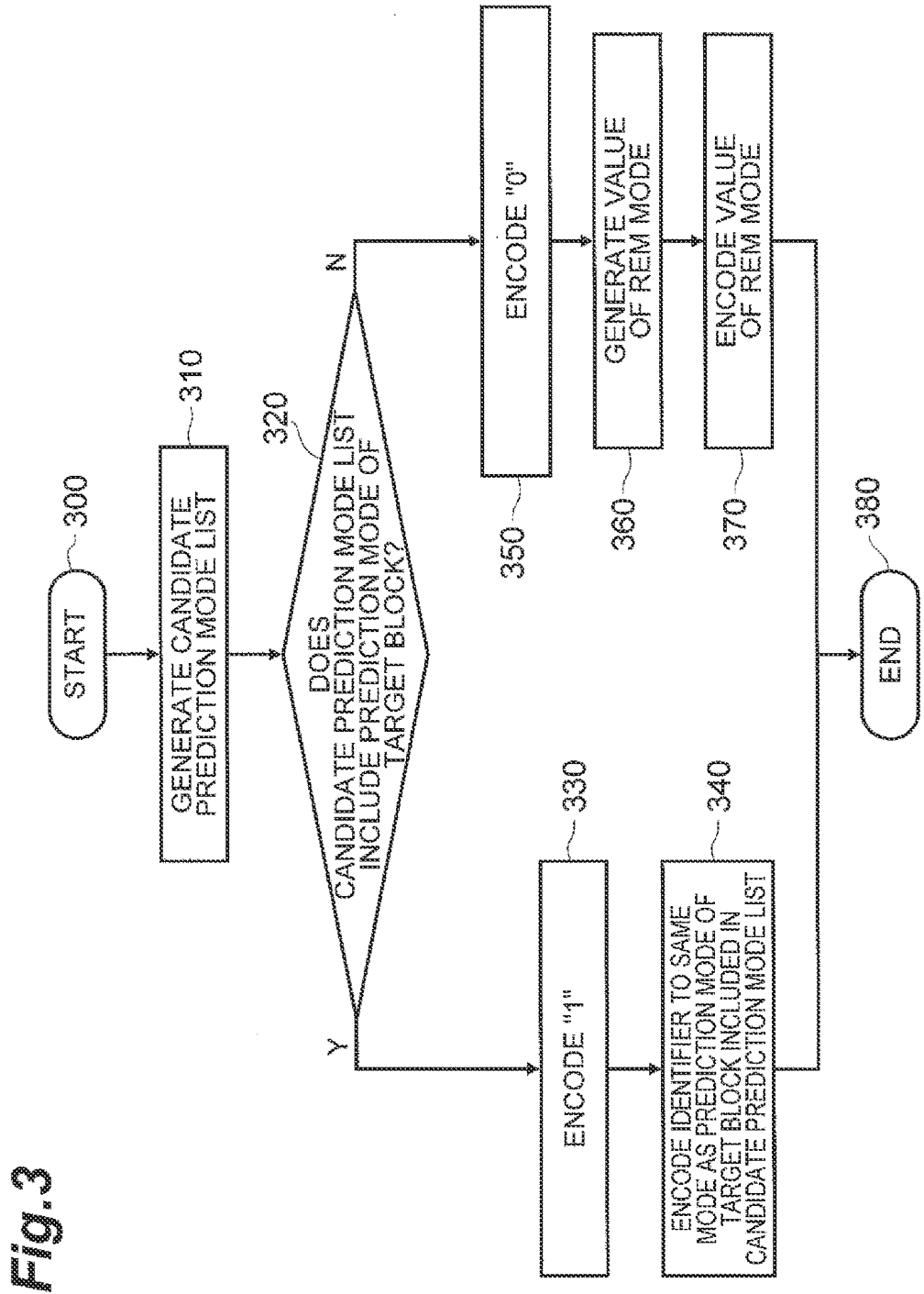
FIG. 3 is a flowchart showing example processing of an intra-frame prediction mode encoder according to an embodiment of the predictive coding system.
Figure 4:
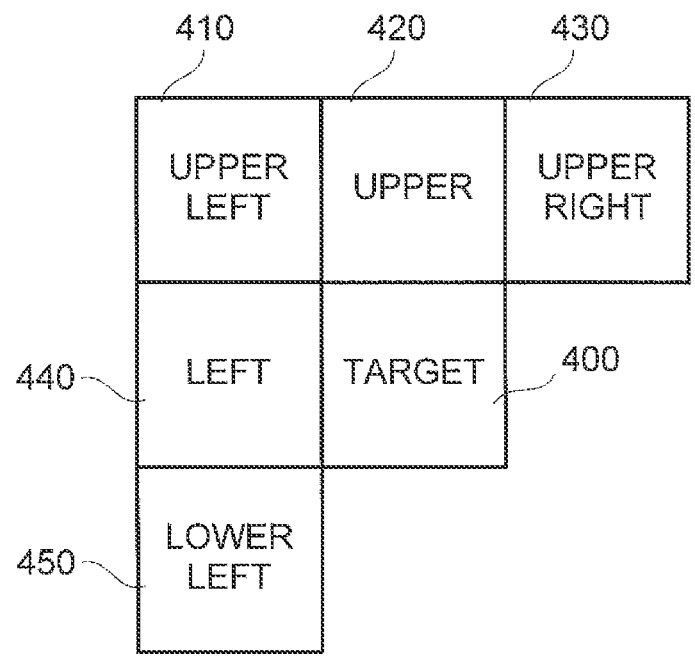
FIG. 4 is a schematic diagram showing an example for explaining an encoding process of an intra-frame prediction mode according to an embodiment of the predictive coding system.

FIG. 3 is a flowchart showing the processing of the intra-frame prediction mode encoder 117 according to an embodiment of the predictive coding system. Step 310 can be first to generate a list of candidate prediction modes. Elements in this list are prediction modes of a plurality of previously-reproduced blocks located around the target block. In the present embodiment, prediction modes possessed by surrounding previously-reproduced blocks 410-450, which are neighboring target block 400 shown in FIG. 4 are defined as elements in the candidate prediction mode list. FIG. 6 (A) is an example of the candidate prediction mode list and numerical values in respective boxes represent identification numbers of the prediction modes corresponding to the respective surrounding blocks (410 to 450). In this example, the surrounding blocks (410 to 450) have respective prediction modes that are different from each other, but if the same prediction mode appears in multiple of the elements, it can be handled as one element. For example, if blocks 410 and 420 have the same prediction mode, the number of elements in the candidate prediction mode list is not 5 but 4. For example, the number of elements in the candidate prediction mode list can be at most 5 and at least 1. If the surrounding blocks neighboring the target block are "inter-frame" predicted ones, there can be no intra-frame prediction mode. In the present embodiment, mode 2 (DC prediction) is the only element in the candidate prediction mode list. FIG. 6 (A) shows an example of an arrangement of the values of the elements in the candidate prediction mode list in increasing order, but the candidate prediction mode list may be configured in decreasing order. In order to construct the candidate prediction mode list for encoding of the prediction mode of the subsequent block, the intra-frame prediction mode encoder 117 stores the prediction mode of the current target block into the aforementioned storage memory.

Next, step 320 is to compare the intra-frame prediction mode of the target block with each of the elements in the candidate prediction mode list to check whether there is a coincident element.

When the intra-frame prediction mode of the target block is found in the candidate prediction mode list, the processing proceeds to step 330. In this step, a determined value, such as a "1" is encoded. This "1" indicates that the intra-frame prediction mode of the target block is included in the candidate prediction mode list. The next step is to encode an identifier (index) to the element in the candidate prediction mode list coincident with the prediction mode of the target block (step 340). In the present example embodiment, 0, 1, 2, 3, and 4 are assigned to respective indices of the boxes from the left in FIG. 6 (A) and, in the case where the prediction mode of the target block is "8", 2 is encoded as an index. These indices may be encoded by using base-1 codes (unary codes). For example, codes of (0, 01, 001, 0001, 00001) are assigned to (0, 1, 2, 3, 4), respectively. The last bit in the code of the maximum index may be discarded. Thus, for example, the code "00001" for "4" can be "0000". Another example method is to encode the indices by fixed-length codes. In that example case, the code length of fixed codes may be varied depending upon the size of the candidate prediction mode list (the number of elements). For example, in the case where the size of the candidate prediction mode list is 4, the indices can be encoded by two bits, and in the case where the size is 2, the indices can be encoded by one bit. Efficient coding is coding of indices based on the size of the candidate prediction mode list (the number of elements). In other examples, any other values that include one or more numbers, letters and/or characters may be used.

When it is determined in step 320 that the intra-frame prediction mode of the target block is absent in the candidate prediction mode list, the processing proceeds to step 350. In this step, a predetermined value, such as "0" is encoded. In this example, the "0" indicates that the intra-frame prediction mode of the target block is not included in the candidate prediction mode list. In this case, it is necessary to encode the prediction mode of the target block. In the present example embodiment the prediction mode of the target block is encoded as "REM mode". Since it is known that the prediction mode of the target block is absent in the candidate prediction mode list, an identification value, such as an identification number, to be encoded herein is not the original identification value of the prediction mode, but is instead one of identification values reassigned to the remaining prediction modes after exclusion of the elements in the candidate prediction mode list. An illustrative example will be described using FIG. 6. FIG. 6 (A) shows an example of elements in the candidate prediction mode list, which does not include an element corresponding to the prediction mode of the target block. Therefore, the remaining prediction modes after exclusion of these prediction modes are shown in the example of FIG. 6 (B). The result of reassignment of the example values 0, 1, 2, 3, 4 . . . to the respective boxes from the left in this FIG. 6 (B) is shown in the example of FIG. 6 (C). For example, in the case where the prediction mode of the target block is a value, such as "9", "9" is not encoded, but a value such as "6" is encoded as REM mode because "6" in FIG. 6 (C) is reassigned to "9" in FIG. 6 (B). The same prediction mode of the target block can be encoded by a smaller numerical value, or a smaller bit count. The reassignment of the identification number of the prediction mode in this manner is carried out in step 360 in FIG. 3.

Figure 5:
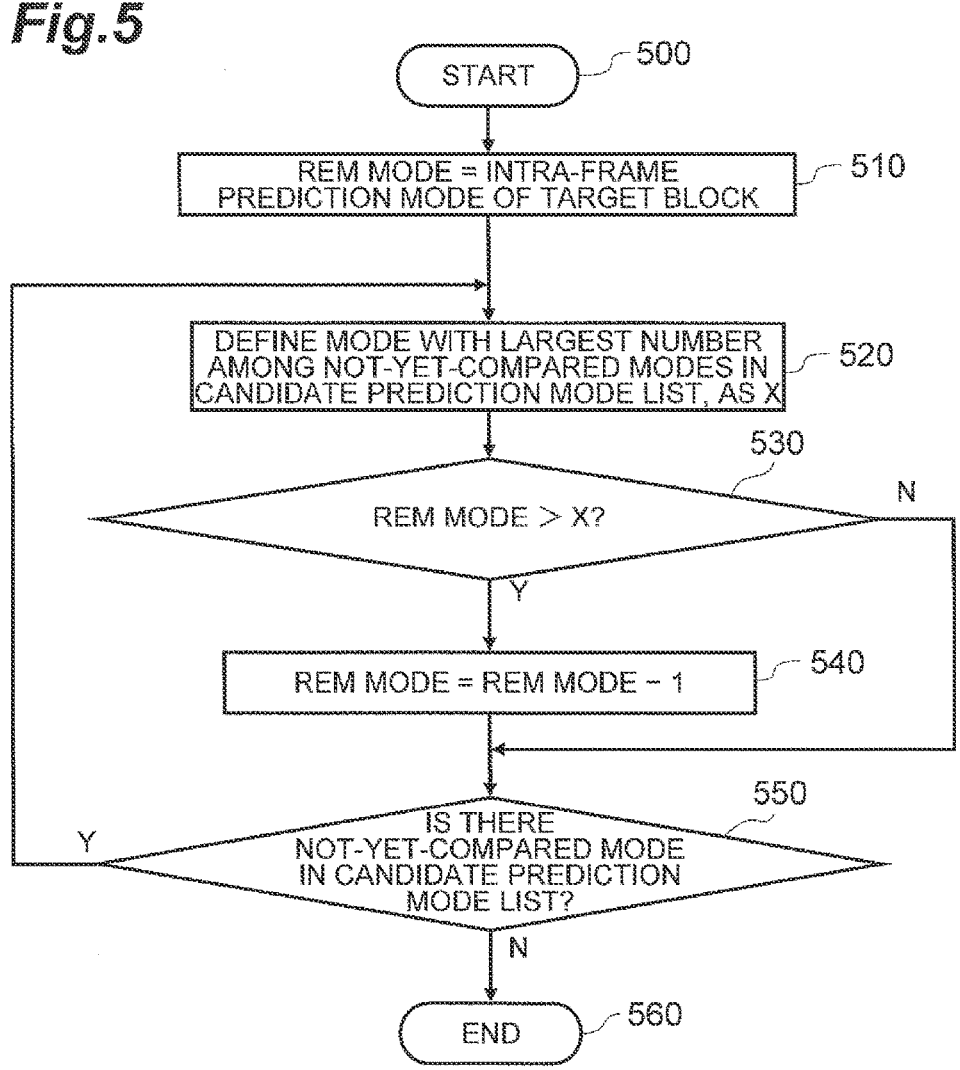
FIG. 5 is a flowchart showing an example generation process of REM mode number (step 360) in the processing of the intra-frame prediction mode encoder (FIG. 3) according to an embodiment of the predictive coding system.

Another execution method of step 360 is shown in the example of FIG. 5. In step 510 the identification number of the intra-frame prediction mode for the determined target block can be used as the REM mode. In step 520, the largest element among elements in the candidate prediction list which are not yet used in comparison is defined with a predetermined identifier, such as X. Step 530 is to compare the REM mode with X. When the REM mode is, for example, larger than X, step 540 is carried out to, in this example, subtract 1 from the value of the REM mode. Step 550 is to check whether there is a not-yet-compared element in the candidate prediction list; if yes, the processing returns to step 520; if no, the processing is terminated.

As an example modification of the processing of FIG. 5, step 520 is configured to define the smallest element as X and step 530 is changed to "intra-frame prediction mode of target block≤X?", with the same result. In this case, when the answer of "intra-frame prediction mode of target block≤X?" is no, the processing is immediately terminated.

The value of the REM mode generated in this manner is encoded in step 370. In the present example embodiment, the value of the REM mode is encoded by a fixed-length code, but it is also possible to encode the value of the REM mode by a variable-length code. The code length of these values of the REM mode may be based on the number of elements in a complementary set of the candidate prediction mode list.

Figure 10:
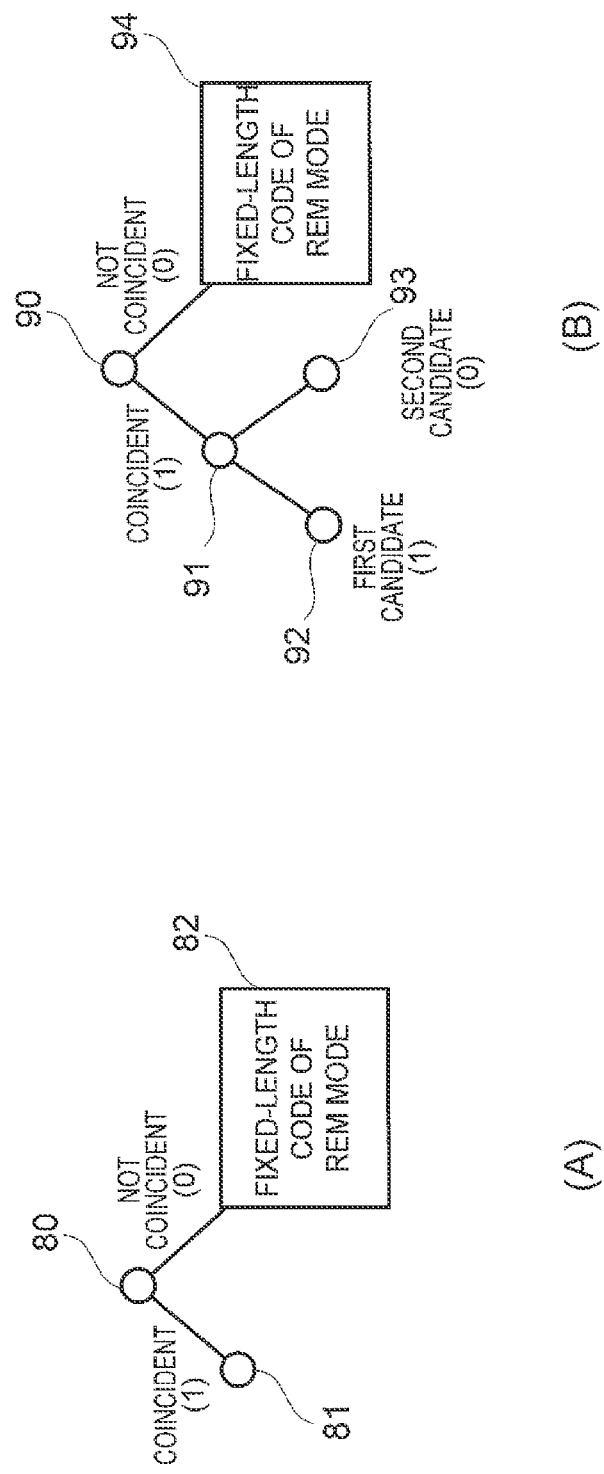
FIG. 10 is a schematic diagram describing an example process of an intra-frame prediction mode encoding method using two candidate prediction modes, according to an embodiment of the predictive coding system.

The present example embodiment describes the case where the size S of the candidate prediction mode list (the number of elements) was at most 5, but S may be an arbitrary number. It is, however, noted that the encoding device and decoding device need to generate this list by the same method. In the example case where the candidate prediction mode list is generated from the prediction modes of the upper block (420) and the left block (440) with respect to the target block 400 in FIG. 4, S=2. In this example case, there are two types of candidate prediction mode lists. When the two surrounding blocks both are intra-frame predicted ones, the list contains two elements; when only one of the surrounding blocks is an intra-frame predicted one, the list contains one element. The case of one list element is shown in FIG. 10 (A) and the case of two list elements is shown in FIG. 10 (B). In other examples, any other blocks may be used.

Node 80 in the example of FIG. 10 (A) indicates whether the candidate prediction mode list contains an element coincident with the prediction mode of the target block. When there is no coincident element, the REM mode is encoded (82). When there is a coincident element (81), there is no need for encoding of an index because the list contains only one element. In the example of FIG. 10 (B), similarly, the REM mode is encoded when there is no coincident element in the list (94). When there is a coincident element (91), there are two elements and therefore an index to indicate which is coincident between the first and second candidates is encoded.

Figure 7:
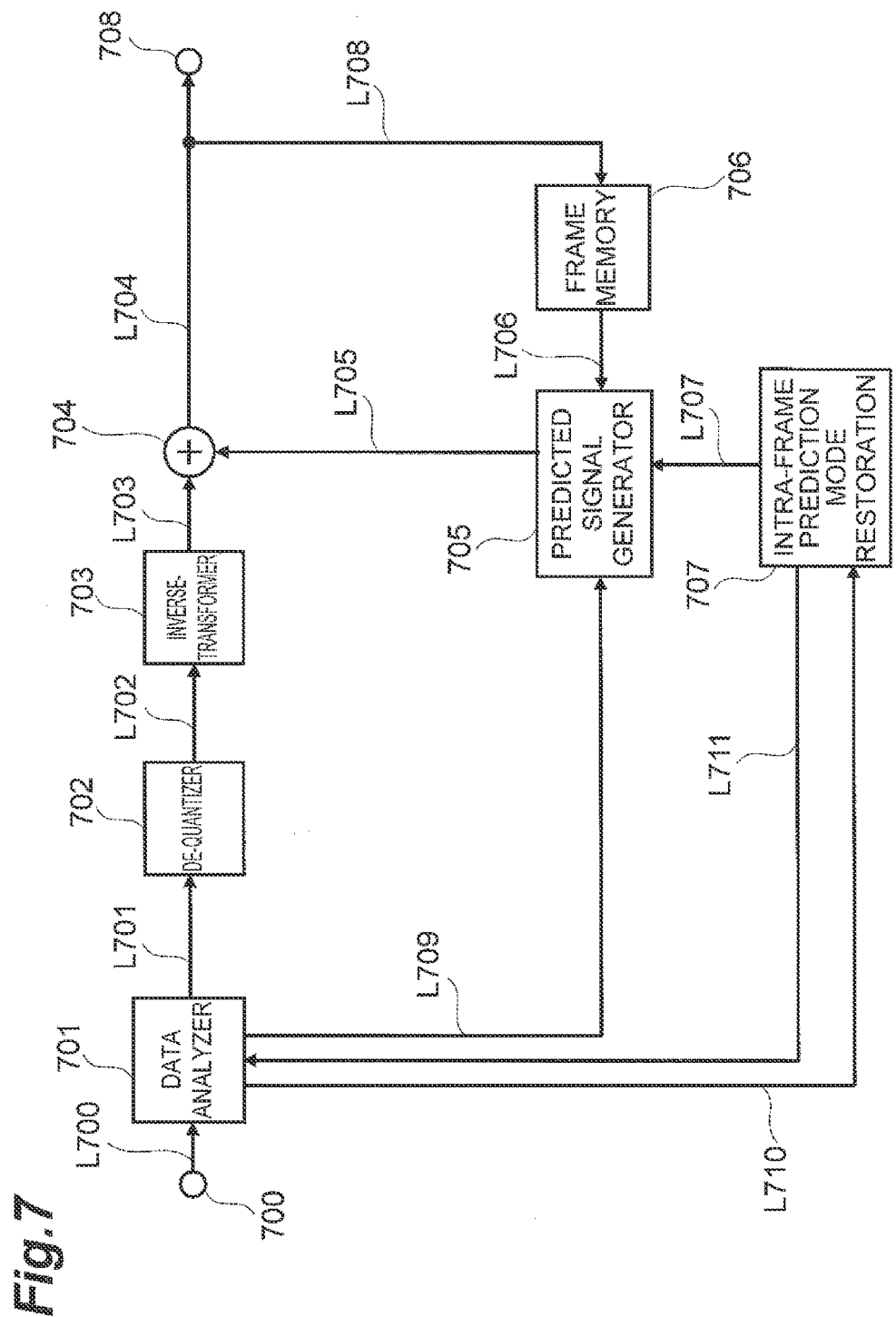
FIG. 7 is a block diagram showing example of an image predictive decoding device according to an embodiment of the predictive coding system.

Next, an image predictive decoding method according to the present invention will be described. FIG. 7 is an example of a block diagram showing an image predictive decoding device according to an embodiment of the predictive coding system. The image predictive decoding device may be a computing device or computer, including for example software, hardware, or a combination of hardware and software, as described later, capable of performing the described functionality. The image predictive decoding device may be one or more separate systems or devices included in the predictive coding system, or may be combined with other systems or devices within the predictive coding system. In other examples, fewer or additional blocks may be used to illustrate the functionality of the image predictive decoding device. The image predictive decoding device may include input terminal unit 700, data analyzer unit 701, de-quantizer unit 702, inverse-transformer unit 703, adder unit 704, predicted signal generator unit 705, frame memory unit 706, intra-frame prediction mode restoration unit 707, and output terminal unit 708.

Describe below is an example of operation of the image predictive decoding device configured as described above. Compressed data resulting from the compression encoding by the foregoing method is input through the input terminal 700. This compressed data contains the residual signal resulting from the prediction and encoding of the target block obtained by division of a picture into a plurality of blocks, and the mode information about the prediction method. The data analyzer 701 analyzes the compressed data to extract the residual signal of the target block, the information about the prediction method, the quantization parameter, and the motion information in the case of the inter-frame prediction, or encoded information about the aforementioned intra-frame prediction mode for an intra-frame predicted block. The residual signal and quantization parameter of the target block are sent (via line L701) to the de-quantizer 702, to be subjected to de-quantization. The result is transformed by an inverse discrete cosine transform by the inverse-transformer 703.

When the data analyzer 701 determines that the target block is an inter-frame predicted one, the motion information is fed via line L709 to the predicted signal generator 705. The predicted signal generator 705 acquires a predicted signal from reconstructed pictures in the frame memory 706, based on the motion information. On the other hand, when the data analyzer 701 determines that the target block is an intra-frame predicted one, the mode information about the intra-frame prediction is sent via line L710 to the intra-frame prediction mode restoration unit 707 and the intra-frame prediction mode is restored and sent to the predicted signal generator 705. The predicted signal generator 705 acquires previously-reproduced (previously decoded) pixel signals in the same frame from the frame memory 706, based on the intra-frame prediction mode, to generate a predicted signal. Example of generation methods of intra-frame predicted signals were described above with reference to FIG. 2. The details of the intra-frame prediction mode restoration unit 707 will be described later.

The predicted signal generated by the predicted signal generator 705 is sent via line L705 to the adder 704, and the adder 704 adds the restored residual signal to the predicted signal to reproduce a pixel signal of the target block. The reproduced picture is output via line L704 and, at substantially the same time, is stored via line 708 into the frame memory 706.

Next, the processing of the intra-frame prediction mode restoration unit 707 according to the present example embodiment will be described. The output from the intra-frame prediction mode restoration unit 707 is an identification value, such as a number, of the intra-frame prediction mode of the target block and is output via line L707 and, at substantially the same time, is stored into a memory (not shown) in the intra-frame prediction mode restoration unit 707 because it can be used for restoration of the prediction mode of the subsequent block.

Figure 8:
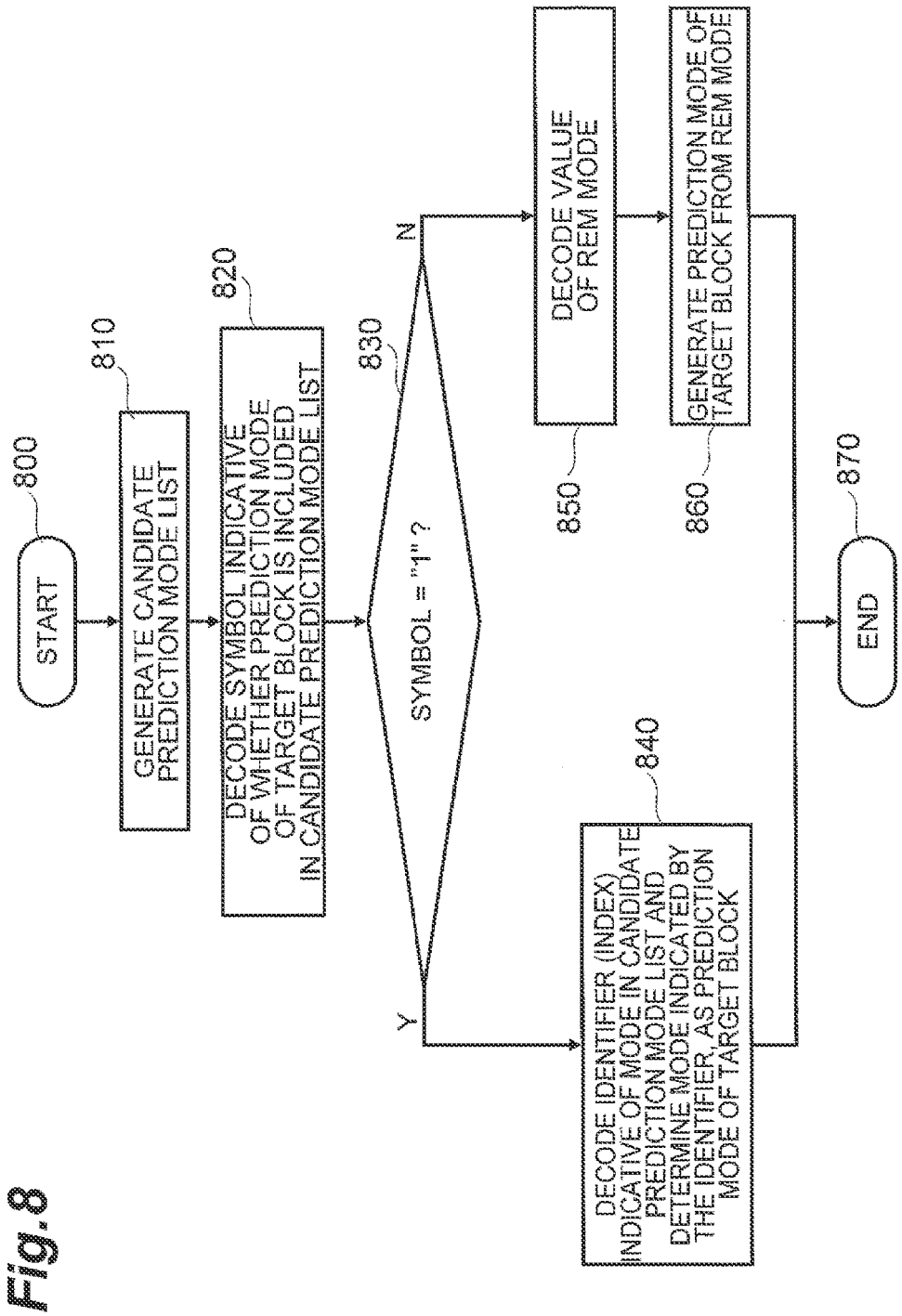
FIG. 8 is a flowchart showing example processing of an intra-frame prediction mode decoder according to an embodiment of the predictive coding system.

FIG. 8 is a flowchart showing an example of the processing of the intra-frame prediction mode decoder according to an embodiment of the predictive coding system. Step 810 is first to generate a list of candidate prediction modes. Elements in this list are prediction modes of a plurality of previously-reproduced blocks (410 to 450) located around a target block, such as target block 400 shown in FIG. 4. The specific description is similar to that of step 301 in the example of FIG. 3. The encoding device and decoding device generate this candidate prediction mode list by the same method.

Next step 820 is to decode at least one bit. When one bit is transmitted via line L710 from the data analyzer 701, actual decoding processing is carried out by the data analyzer 701. This one bit can indicate whether the intra-frame prediction mode of the target block is included in the candidate prediction mode list. Then, step 830 is to perform a comparison to determine whether this one bit is a predetermined value, such as "1". If the one bit is "1", the processing proceeds to step 840. Otherwise, the processing proceeds to step 850.

Since the intra-frame prediction mode of the target block is included in the candidate prediction mode list, step 840 is configured to further decode the identifier (index) indicating which element in the candidate prediction mode list coincides with the intra-frame prediction mode of the target block. The element in the candidate prediction mode list indicated by the index is the prediction mode of the target block. For example, when the index is "2", the mode identification number "8" in the third box from the left in FIG. 6 (A) is the prediction mode of the target block. In the present embodiment, for example, this index is decoded as a base-1 code (unary code). As another example, where the encoding used determines the bit length of the index based on the size of the candidate prediction mode list (the number of elements), the size of the candidate prediction mode list (the number of elements) can be sent to the data analyzer 701 (line L711).

Since the intra-frame prediction mode of the target block is not included in the candidate prediction mode list, step 850 is configured to decode the value of the REM mode. In the present embodiment the value of the REM mode can be restored as a numerical value of a fixed-length code. The value of the REM mode is different from the actual identification number of the prediction mode (as described with reference to the example of FIG. 5) and therefore, step 860 is to remap the value to the actual identification number to obtain the intra-frame prediction mode of the target block.

Figure 9:
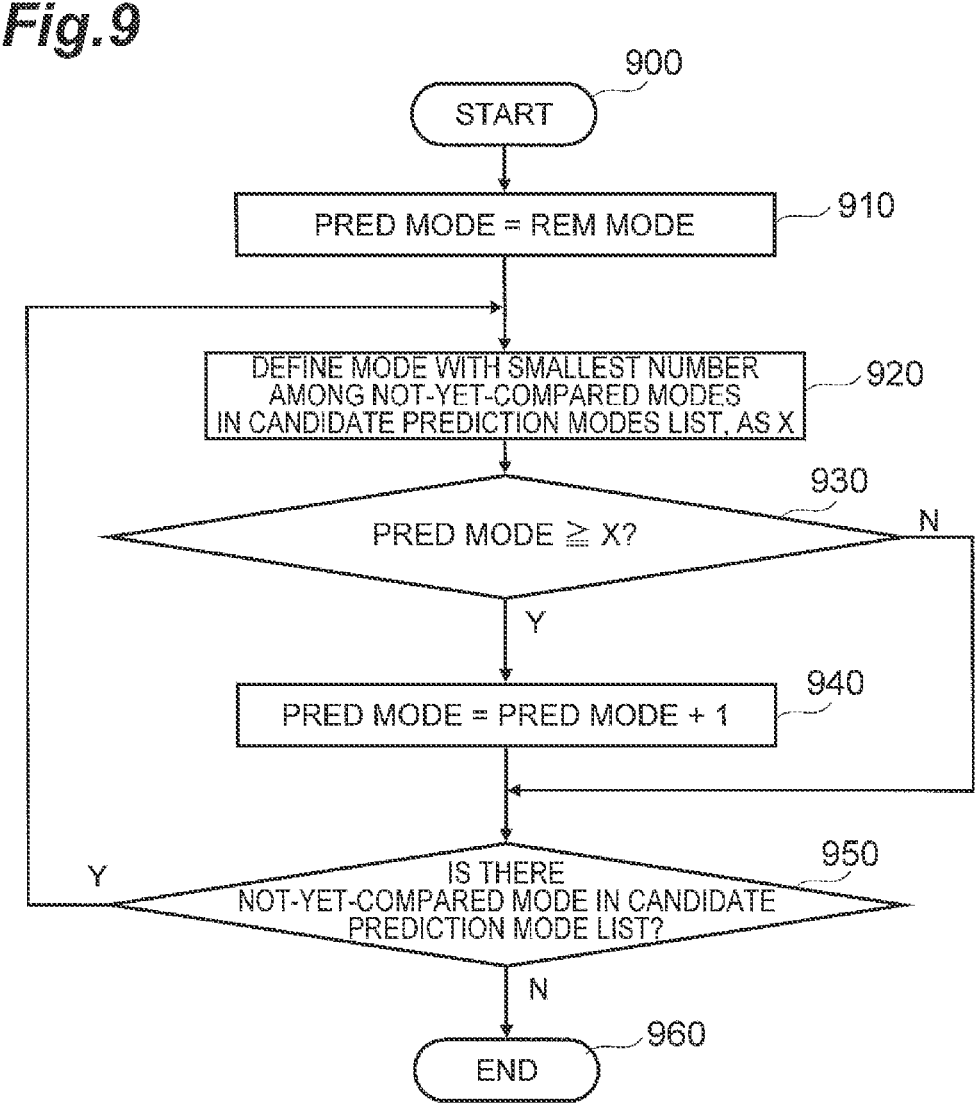
FIG. 9 is a flowchart showing an example of a generation process of a prediction mode of a target block (step 860) in the processing of the intra-frame prediction mode decoder (FIG. 8) according to an embodiment of the predictive coding system.

FIG. 9 shows an example of an execution method for returning the a first mode, such as a REM mode to the actual identification number of the prediction mode. Step 910 is to substitute the decoded value of REM mode into a second mode, such as a PRED mode. This PRED mode is a variable for the intra-frame prediction mode of the target block.

Step 920 is to define an element as a predetermined value, such as X, which is the smallest number among elements not used in comparison yet in the candidate prediction mode list. Step 930 is to compare the PRED mode with X. When the PRED mode is larger than or equal to X, step 940 is carried out to, for example, add 1 to the value of the PRED mode. Step 950 is to check whether there is a not-yet-compared element in the candidate prediction list; if yes, the processing returns to step 920; if no, the processing is terminated. The PRED mode after completion of this processing provides the actual identification number of the prediction mode of the target block.

Instead of the example processing of FIG. 9, it is also possible to adopt a method of creating the complementary set of the example of FIG. 6 (A) as shown in the example of FIG. 6 (B) and defining the (N+1)th (N=the value of REM mode) element from the left, as the prediction mode of the target block.

The intra-frame prediction mode restoration unit 707 is depicted as an independent function block in FIG. 7, but it may be incorporated into the data analyzer 701 in other examples. In this case, the line L710 is connected directly to the predicted signal generator 705 and the intra-frame prediction mode is sent via the line L710 to the predicted signal generator 705.

The above embodiment describes the encoding of the prediction mode information about the intra-frame prediction, but the same encoding and decoding methods can also be applied to the inter-frame prediction case. The information about the prediction mode in the inter-frame prediction case may also be encoded and decoded using the candidate prediction mode list. In this case, the candidate prediction mode list contains elements of information of inter-frame prediction modes of surrounding previously-reproduced blocks. Furthermore, the motion information in the inter-frame prediction case can also be similarly encoded and decoded. In this case, the candidate prediction mode list contains elements of motion information of surrounding previously-reproduced blocks.

An image predictive encoding program executable by a computer to perform the image predictive encoding of the predictive coding system can be stored in a recording medium or computer readable storage medium. Furthermore, an image predictive decoding program executable by a computer to perform the image predictive decoding of the predictive coding system can be stored in a recording medium or computer readable storage medium. Examples of recording media or computer readable storage medium include recording media such as flexible disks, CD-ROMs, DVDs, or ROMs, or semiconductor memories, or the like.

Figure 15:
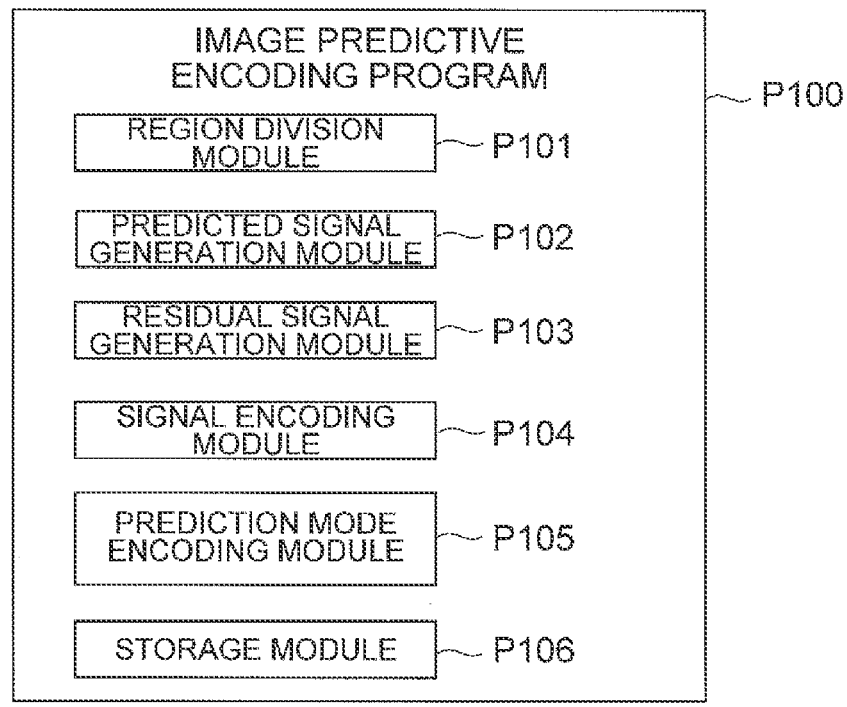
FIG. 15 is a block diagram showing an example of modules of an image predictive encoding program.
Figure 16:
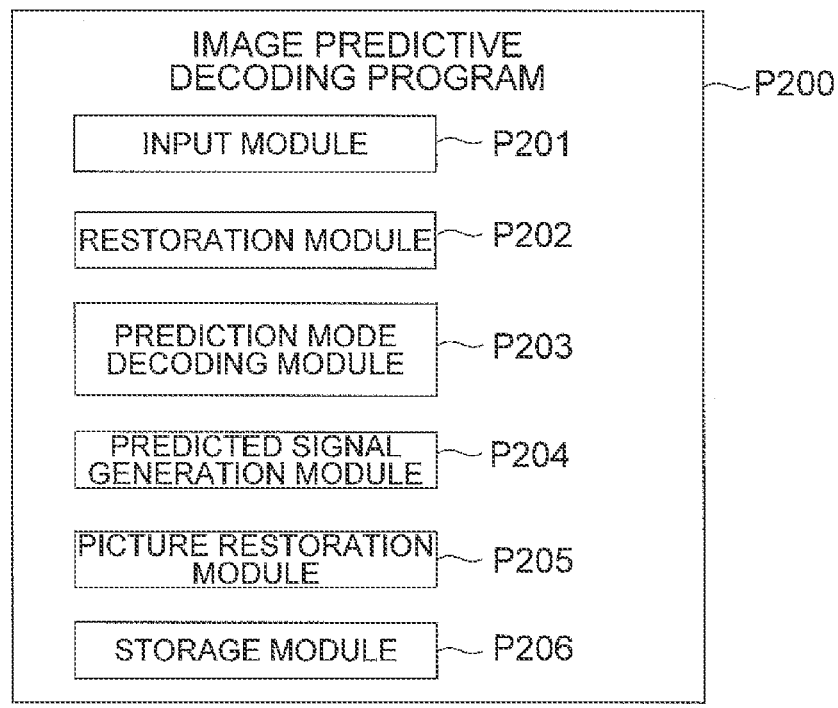
FIG. 16 is a block diagram showing an example of modules of an image predictive decoding program.

FIG. 15 is a block diagram showing an example of modules of the image predictive encoding program capable of executing at least a portion of the image predictive encoding. At least a part of the image predictive encoding program P100 can be provided with region division module P101, predicted signal generation module P102, residual signal generation module P103, signal encoding module P104, prediction mode encoding module P105, and storage module P106. Functions implemented upon execution of the above respective modules by a computer are at least part of the functions of the above-described image predictive encoding device. FIG. 16 is a block diagram showing an example of modules of the image predictive decoding program capable of executing at least a portion of the image predictive decoding. At least part of the image predictive decoding program P200 can be provided with input module P201, restoration module P202, prediction mode decoding module P203, predicted signal generation module P204, picture restoration module P205, and storage module P206. Functions implemented upon execution of the above respective modules by a computer are at least part of the functions of the above-described image predictive decoding device. The image predictive encoding program P100 and the image predictive decoding program P200 configured as described above are stored in a recording medium or computer readable storage medium, and are executed by a computer, such as the example described below.

Figure 11:
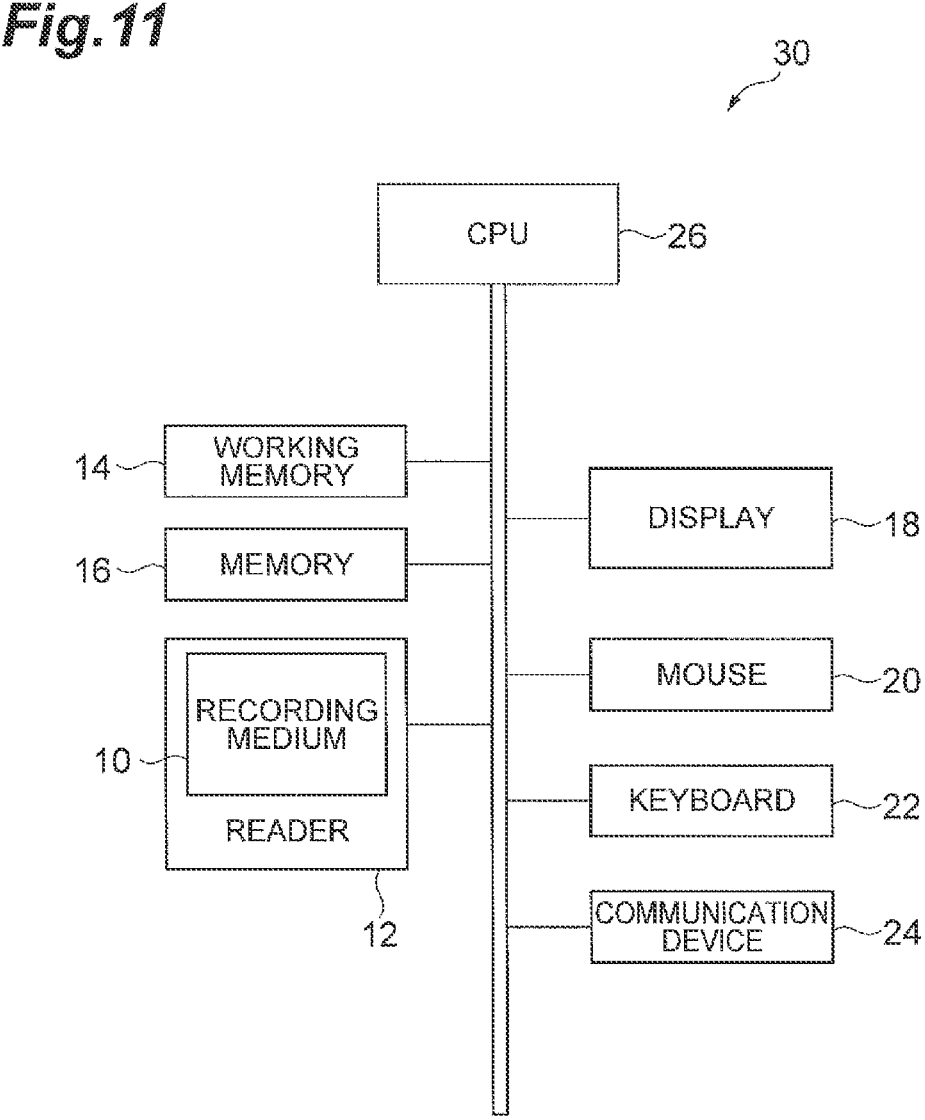
FIG. 11 is a drawing showing an example hardware configuration of a computer for executing a program recorded in a recording medium.
Figure 12:
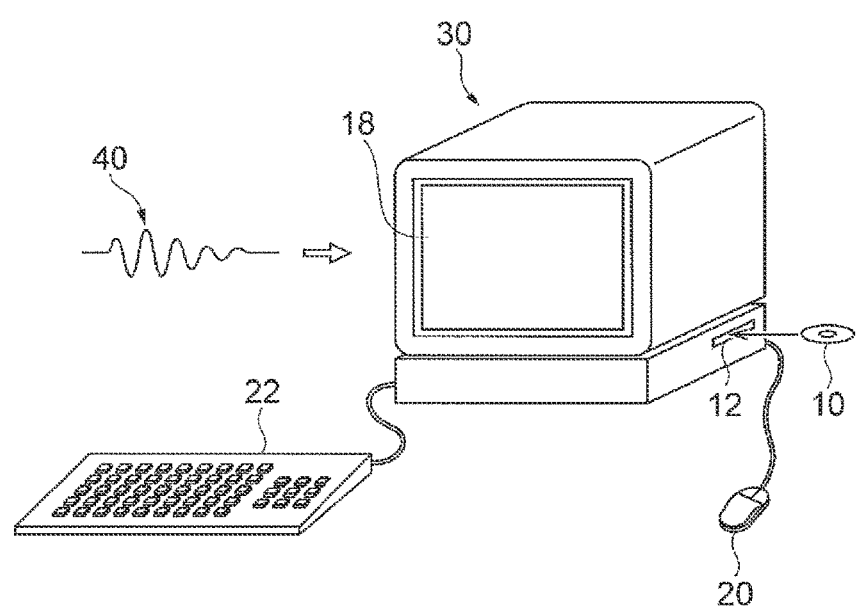
FIG. 12 is a perspective view of an example computer for executing a program stored in a recording medium.

FIG. 11 is a drawing showing an example of a hardware configuration of a computer for executing a program recorded in a recording medium and FIG. 12 a perspective view of an example of a computer for executing a program stored in a recording medium. The computer may be included in a DVD player, a set-top box, a cell phone, or any other computing device that can include a CPU and is configured or configurable to perform processing and control based at least partially on executable instructions.

As shown in the example of FIG. 11, computer 30 is provided with a reading device 12 such as a flexible disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device. The computer 30 may also include a working memory 14 that may include an operating system, a memory 16 that stores data, such as at least part of programs, such as programs stored in the recording medium 10. In addition, the working memory C14 and/or the memory C16 may include the memory 207 and the memory 306. The working memory C14 and memory C16 may be one or more non-transitory computer readable storage medium, and can include a solid-state memory such as a memory card or other package that houses one or more non-volatile memories, such as read-only memories. Further, the computer readable medium can include a random access memory or other volatile re-writable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer C10 may have a user interface that includes a monitor device 18 such as a display, a mouse 20 and a keyboard 22 as input devices, a touch screen display, a microphone for receipt of voice commands, a sensor, or any other mechanism or device that allows a user to interface with the computer C10. In addition, the computer C10 may include a communication device 24 for transmission and reception of data and others, and a central processing unit (CPU) 26, or one or more processors, to control execution of the programs. The processor 26 may be one or more one or more general processors, digital signal processors, application specific integrated circuits, field programmable gate arrays, digital circuits, analog circuits, combinations thereof, and/or other now known or later developed devices for analyzing and processing data.

In an example, when the recording medium 10 storing at least part of the program P100 is put into the reading device 12, the computer 30 becomes accessible to the image predictive encoding program P100 stored in the recording medium 10, through the reading device 12, and becomes able to operate as the previously described image predictive encoding device, based on the image predictive encoding program P100. In an example, when the recording medium 10 storing at least part of the image predictive decoding program P200 is put into the reading device 12, the computer 30 becomes accessible to the image predictive decoding program P200 stored in the recording medium 10, through the reading device 12, and becomes able to operate as the previously described image predictive decoding device, based on the image predictive decoding program P200.

LIST OF REFERENCE SIGNS

101: input terminal; 102: block divider; 103: inter-frame predicted signal generation method determiner; 104: inter-frame predicted signal generator; 105: intra-frame predicted signal generation method determiner; 106: intra-frame predicted signal generator; 109: changeover switch; 110: subtracter; 111: transformer; 112: quantizer; 113: de-quantizer; 114: inverse-transformer; 115: adder; 116: frame memory; 117: intra-frame prediction mode encoder; 118: entropy encoder; 119: output terminal; 700: input terminal; 701: data analyzer; 702: de-quantizer; 703: inverse-transformer; 704: adder; 705: predicted signal generator; 706: frame memory; 707: intra-frame prediction mode restoration unit; 708: output terminal.

We claim:

1. An image predictive decoding device comprising:
a processor;
an input unit executable with the processor to accept input of compressed picture data and encoded information, the compressed picture data containing a residual signal generated by division of a picture into a plurality of blocks and performing predictive encoding of a target block, and the encoded information about a prediction mode indicative of a generation method of a predicted signal of the target block;
a restoration unit executable with the processor to extract the residual signal of the target block from the compressed picture data to restore a reproduced residual signal;
a prediction mode decoding unit executable with the processor to restore the encoded information about the prediction mode to generate a prediction mode;
a predicted signal generation unit executable with the processor to generate the predicted signal of the target block based on the prediction mode;
a picture restoration unit executable with the processor to add the predicted signal to the reproduced residual signal to restore a pixel signal of the target block; and
a storage unit executable with the processor to store the restored pixel signal as a reproduced pixel signal,
wherein the prediction mode decoding unit is executable with the processor to generate a candidate prediction mode list by adding, as elements, prediction modes of a plurality of previously-reproduced blocks neighboring the target block, the candidate prediction mode list containing no duplicate prediction modes as the elements;
wherein the prediction mode decoding unit is further executable with the processor to decode a flag that indicates whether or not the candidate prediction mode list contains an element corresponding to the prediction mode;
when the flag indicates that the candidate prediction mode list contains the corresponding element, the prediction mode decoding unit is further executable with the processor to decode an index indexing the candidate prediction mode list to obtain an element indicated by the index as the prediction mode; and
when the flag indicates that the candidate prediction mode list does not contain the corresponding element, the prediction mode decoding unit is further executable with the processor to:
decode a REM (remaining) mode;
set a variable for the intra-frame prediction mode of the target block equal to a decoded value of the REM mode;
repeatedly perform the following steps for every element in the candidate prediction list:
a step of performing a round of comparison between the variable and one of elements in the candidate prediction list that starts from a smallest element on the candidate list in an initial round of comparison and moves in a next round of comparison to a next larger element on the candidate list until reaching a highest element thereon; and
a step of incrementing a value of the variable for use of the incremented value of the variable in a next round of comparison when the variable is larger than or equal to the one of the elements, whereas keeping the value of the variable unchanged for use of the unchanged value of the variable in a next round of comparison when the variable is smaller than the one of the elements; and
use a final value of the variable as a prediction mode for decoding the target block.

2. An image predictive decoding method executed by an image predictive decoding device, the image predictive decoding method comprising:
an input step of accepting input of compressed picture data containing a residual signal and encoded information about a prediction mode, the residual signal being generated by dividing a picture into a plurality of blocks and performing predictive encoding of a target block, and the encoded information about the prediction mode indicative of a generation method of a predicted signal of the target block;
a restoration step of extracting the residual signal of the target block from the compressed picture data to restore a reproduced residual signal;
a prediction mode decoding step of restoring the encoded information about the prediction mode to generate a prediction mode;
a predicted signal generation step of generating the predicted signal of the target block based on the prediction mode;
a picture restoration step of adding the predicted signal to the reproduced residual signal to restore a pixel signal of the target block; and
a storage step of storing the restored pixel signal as a reproduced pixel signal,
wherein the prediction mode decoding step comprises:
generating a candidate prediction mode list by adding, as elements, prediction modes of a plurality of previously-reproduced blocks neighboring the target block, the candidate prediction mode list containing no duplicate prediction modes as the elements;
decoding a flag that indicates whether or not the candidate prediction mode list contains an element corresponding to the prediction mode; and
when the flag indicates that the candidate prediction mode list contains the corresponding element, further decoding an index indexing the candidate prediction mode list to obtain an element indicated by the index as the prediction mode, and wherein when the flag indicates that the candidate prediction mode list does not contain the corresponding element, the prediction mode decoding step further comprises:

decoding a REM (remaining) mode;

setting a variable for the intra-frame prediction mode of the target block equal to a decoded value of the REM mode;

repeatedly performing the following steps for every element in the candidate prediction list:

a step of performing a round of comparison between the variable and one of elements in the candidate prediction list that starts from a smallest element on the candidate list in an initial round of comparison and moves in a next round of comparison to a next larger element on the candidate list until reaching a highest element thereon; and a step of incrementing a value of the variable for use of the incremented value of the variable in a next round of comparison when the variable is larger than or equal to the one of the elements, whereas keeping the value of the variable unchanged for use of the unchanged value of the variable in a next round of comparison when the variable is smaller than the one of the elements; and using a final value of the variable as a prediction mode for decoding the target block.

3. An image predictive decoding method executed by an image predictive decoding device, the image predictive decoding method comprising:

an input step of accepting input of compressed picture data containing a residual signal and encoded information about a prediction mode, the residual signal being generated by dividing a picture into a plurality of blocks and performing predictive encoding of a target block, and the encoded information about the prediction mode indicative of a generation method of a predicted signal of the target block;

a restoration step of extracting the residual signal of the target block from the compressed picture data to restore a reproduced residual signal;

a prediction mode decoding step of restoring the encoded information about the prediction mode to generate a prediction mode;

a predicted signal generation step of generating the predicted signal of the target block based on the prediction mode;

a picture restoration step of adding the predicted signal to the reproduced residual signal to restore a pixel signal of the target block; and a storage step of storing the restored pixel signal as a reproduced pixel signal, wherein the prediction mode decoding step comprises:

generating a candidate prediction mode list containing no duplicate prediction modes as elements, by comparing prediction modes, among them, of previously-reproduced blocks neighboring the target block to identify any duplicate modes among the prediction modes, and, adding, as an element, the prediction modes to the candidate prediction mode list without duplication of prediction modes;

decoding a flag that indicates whether or not the candidate prediction mode list contains an element corresponding to the prediction mode; and when the flag indicates that the candidate prediction mode list contains the corresponding element, further decoding an index indexing the candidate prediction mode list to obtain an element indicated by the index as the prediction mode, and wherein when the flag indicates that the candidate prediction mode list does not contain the corresponding element, the prediction mode decoding step further comprises:

decoding a REM (remaining) mode;

setting a variable for the intra-prediction mode of the target block equal to a decoded value of the REM mode, repeatedly performing the following steps for every element in the candidate prediction list:

a step of round of comparison between the variable and one of elements in the candidate prediction list that starts from a smallest element on the candidate list in an initial round of comparison and moves in a next round of comparison to a next larger element on the candidate list until reaching a highest element thereon; and a step of incrementing a value of the variable for use of the incremented value of the variable in a next round of comparison when the variable is larger than or equal to the one of the elements, whereas keeping the value of the variable unchanged for use of the unchanged value of the variable in a next round of comparison when the variable is smaller than the one of the elements; and using a final value of the variable as a prediction mode for decoding the target block.

\* \* \* \* \*